United States Patent
Yang et al.

(10) Patent No.: US 10,285,149 B2
(45) Date of Patent: May 7, 2019

(54) ORTHOGONAL TRAINING FIELD SEQUENCES FOR PHASE TRACKING

(71) Applicant: QUALCOMM Incorporated, San Diego, CA (US)

(72) Inventors: Lin Yang, San Diego, CA (US); Bin Tian, San Diego, CA (US); Tao Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 15/182,554

(22) Filed: Jun. 14, 2016

(65) Prior Publication Data

US 2016/0365955 A1 Dec. 15, 2016

Related U.S. Application Data

(60) Provisional application No. 62/190,245, filed on Jul. 8, 2015, provisional application No. 62/188,331, filed
(Continued)

(51) Int. Cl.
*H04W 56/00* (2009.01)
*H04W 72/04* (2009.01)
(Continued)

(52) U.S. Cl.
CPC ...... *H04W 56/0035* (2013.01); *H04B 7/0452* (2013.01); *H04B 7/0456* (2013.01);
(Continued)

(58) Field of Classification Search
CPC .............. H04W 56/0035; H04W 72/04; H04L 27/2613; H04L 27/2602; H04L 5/0048;
(Continued)

(56) References Cited

U.S. PATENT DOCUMENTS 9,654,308 B2 * 5/2017 Li .................... H04L 25/0226
9,693,261 B1 6/2017 Chu et al.
(Continued)

FOREIGN PATENT DOCUMENTS

EP 1693972 A2 8/2006

OTHER PUBLICATIONS

Li Q., et al., "HE-LTF Sequence for UL MU-MIMO", IEEE 802.11-15/0602r2, May 2015, Slide 1-Slide 29.
(Continued)

*Primary Examiner* — Tejis Daya
(74) *Attorney, Agent, or Firm* — Patterson & Sheridan, L.L.P. Qualcomm

(57) ABSTRACT

Techniques are provided for phase tracking in wireless communications using frames with some portions that use relatively long symbol durations. One technique includes generating a frame having a plurality of orthogonal training field sequences. Each orthogonal training field sequence is assigned to a different spatial stream. The frame is output for transmission as a single user (SU) transmission, a downlink multi-user (MU) multiple input multiple output (MIMO) transmission, or an orthogonal frequency division multiple access (OFDMA) transmission. After obtaining the frame, channel estimation and/or phase tracking may be performed based on the orthogonal training field sequences.

10 Claims, 17 Drawing Sheets

Related U.S. Application Data on Jul. 2, 2015, provisional application No. 62/180,030, filed on Jun. 15, 2015.

(51) Int. Cl.

| | |
|---|---|
| *H04B 7/0456* | (2017.01) |
| *H04B 7/0452* | (2017.01) |
| *H04L 5/00* | (2006.01) |
| *H04L 25/02* | (2006.01) |
| *H04L 27/26* | (2006.01) |

(52) U.S. Cl.
CPC .......... *H04L 5/0023* (2013.01); *H04L 5/0048* (2013.01); *H04L 25/0204* (2013.01); *H04L 27/2602* (2013.01); *H04L 27/2613* (2013.01); *H04W 72/04* (2013.01)

(58) Field of Classification Search
CPC . H04L 5/0023; H04L 25/0204; H04B 7/0452; H04B 7/0456
See application file for complete search history.

(56) References Cited

U.S. PATENT DOCUMENTS

| | | | |
|---|---|---|---|
| 9,712,358 B2 * | 7/2017 | Zhang | H04L 1/0057 |
| 9,716,607 B2 * | 7/2017 | Zhang | H04L 5/0048 |
| 9,729,371 B2 * | 8/2017 | Zhang | H04L 5/0048 |
| 9,768,996 B2 * | 9/2017 | Zhang | H04L 1/0057 |
| 9,954,703 B2 | 4/2018 | Zhang et al. | |
| 2008/0089450 A1 | 4/2008 | Zelst et al. | |
| 2009/0003479 A1 | 1/2009 | Kim et al. | |
| 2010/0290449 A1 | 11/2010 | Van et al. | |
| 2011/0002309 A1 | 1/2011 | Park et al. | |
| 2011/0194545 A1 * | 8/2011 | Yang | H04L 5/0023 370/338 |
| 2011/0194655 A1 | 8/2011 | Sampath et al. | |
| 2012/0039406 A1 | 2/2012 | Srinivasa et al. | |
| 2012/0051476 A1 | 3/2012 | Shi et al. | |
| 2012/0082147 A1 * | 4/2012 | Liu | H04L 5/001 370/338 |
| 2012/0113830 A1 | 5/2012 | Zhu et al. | |
| 2012/0120931 A1 * | 5/2012 | Abraham | H04W 4/08 370/338 |
| 2012/0195391 A1 | 8/2012 | Zhang et al. | |
| 2012/0269142 A1 | 10/2012 | Porat et al. | |
| 2012/0320889 A1 | 12/2012 | Zhang et al. | |
| 2013/0010664 A1 * | 1/2013 | Kang | H04B 7/0452 370/311 |
| 2013/0107893 A1 | 5/2013 | Zhang | |
| 2013/0272198 A1 * | 10/2013 | Azizi | H04W 72/02 370/328 |
| 2013/0315163 A1 | 11/2013 | Zhang et al. | |
| 2013/0315326 A1 * | 11/2013 | Shi | H04L 25/0204 375/267 |
| 2015/0117227 A1 | 4/2015 | Zhang et al. | |
| 2015/0117433 A1 | 4/2015 | Zhang et al. | |
| 2015/0215146 A1 * | 7/2015 | Zhang | H04L 5/0048 370/329 |
| 2015/0222406 A1 * | 8/2015 | Zheng | H04L 1/1685 370/329 |
| 2015/0236880 A1 * | 8/2015 | Zhang | H04L 27/2602 370/338 |
| 2015/0349995 A1 | 12/2015 | Zhang et al. | |
| 2015/0365263 A1 * | 12/2015 | Zhang | H04L 1/0057 375/295 |
| 2016/0072564 A1 * | 3/2016 | Li | H04L 5/0025 370/329 |
| 2016/0353370 A1 | 12/2016 | Choi et al. | |
| 2016/0366659 A1 | 12/2016 | Yang et al. | |

OTHER PUBLICATIONS

International Search Report and Written Opinion—PCT/US2016/037578—ISA/EPO—dated Nov. 7, 2016.
Zhang H(Marvell): "TGah D1.0 PHY Comment Resolutions Capability Fields", IEEE P802.11 Wireless LANs, IEEE 802.11-13-1379r0, IEEE Draft; 11-13-1379-00-00AH-01 0-PHY-Capabilitiescomment-Resolutions, IEEE-SA Mentor, Piscataway, NJ, USA, val. 802.11 ah, Nov. 11, 2013 (Nov. 11, 2011), XP068063394, pp. 1-4, [retrieved on Nov. 11, 2013].

* cited by examiner

- Pilot tone indexes in 20 MHz
  - ±10, ±22, ±36, ±48, ±62, ±76, ±90, ±102, ±116
- Pilot tone indexes in 40 MHz
  - ±10, ±24, ±36, ±50, ±64, ±78, ±90, ±104, ±116, ±130, ±144, ±158, ±170, ±184, ±198, ±212, ±224, ±238
- Pilot tone indexes in 80 MHz
  - ±10, ±24, ±38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494

| Channel Width | RU Size | Pilot Tone Indices |
|---|---|---|
| 20 MHz | 26, 52 | ±10, ±22, ±36, ±48, ±62, ±76, ±90, ±102, ±116 |
| | 106, 242 | ±22, ±48, ±90, ±116 |
| 40 MHz | 26, 52 | ±10, ±24, ±36, ±50, ±64, ±78, ±90, ±104, ±116, ±130, ±144, ±158, ±170, ±184, ±198, ±212, ±224, ±238 |
| | 106, 242, 484 | ±10, ±36, ±78, ±104, ±144, ±170, ±212, ±238 |
| 80 MHz | 26, 52 | ±10, ±24, ±38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494 |
| | 106, 242, 484 | ±24, ±50, ±92, ±118, ±158, ±184, ±226, ±252, ±266, ±292, ±334, ±360, ±400, ±426, ±468, ±494 |
| | 996 | ±24, ±92, ±158, ±226, ±266, ±334, ±400, ±468 |

FIG. 13

- Pilot tone indexes in 20 MHz
  - ±10, ±22, ±36, ±48, ±62, ±76, ±90, ±102, ±116
- Pilot tone indexes in 40 MHz
  - ±8, ±22, ±34, ±48, ±62, ±76, ±88, ±102, ±116, ±130, ±144, ±158, ±170, ±184, ±198, ±212, ±224, ±238
- Pilot tone indexes in 80 MHz
  - ±10, ±22, ±36, ±48, ±62, ±76, ±90, ±102, ±116, ±130, ±144, ±158, ±172, ±184, ±198, ±212, ±226, ±238, ±252, ±264, ±278, ±290, ±304, ±318, ±332, ±344, ±358, ±372, ±386, ±400, ±414, ±426, ±440, ±454, ±468, ±480, ±494

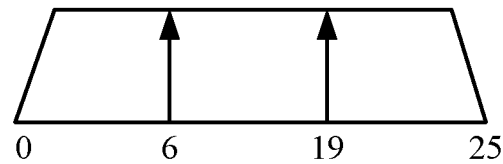
FIG. 18
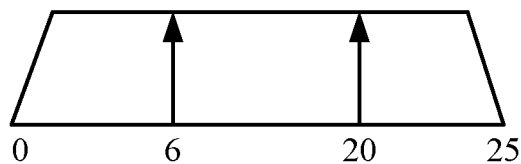
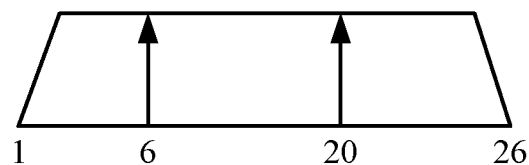
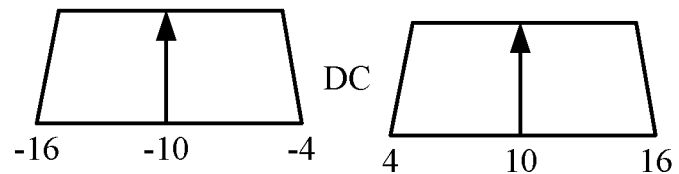
FIG. 19

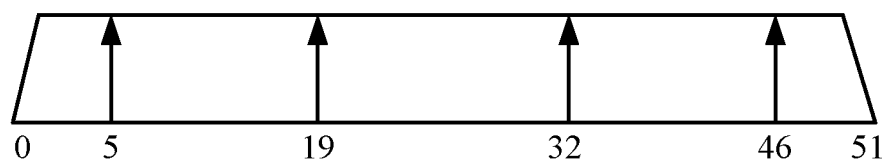
11a 52-tone pilot structure
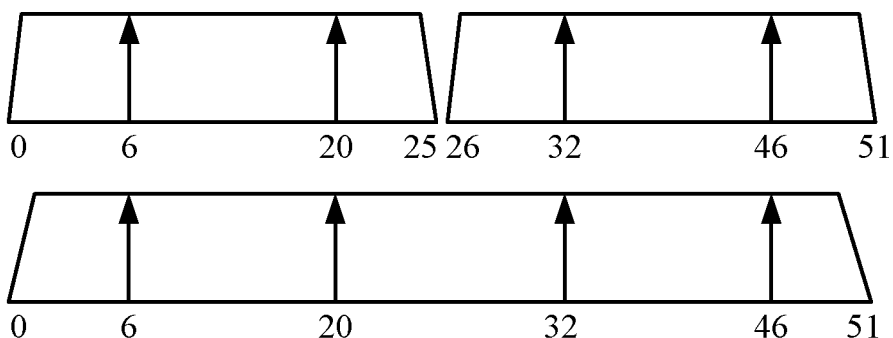
11a 52-tone pilot structure with
aligning to pilots in 26-tone RU
FIG. 20

ORTHOGONAL TRAINING FIELD SEQUENCES FOR PHASE TRACKING

CLAIM OF PRIORITY UNDER 35 U.S.C. § 119

Field of the Disclosure

The present application for patent claims benefit of U.S. Provisional Patent Application Ser. Nos. 62/180,030, filed Jun. 15, 2015, 62/188,331, filed Jul. 2, 2015, and 62/190,245, filed Jul. 8, 2015, each assigned to the assignee hereof and hereby expressly incorporated by reference herein.

BACKGROUND

Field of the Disclosure

Certain aspects of the present disclosure generally relate to wireless communications and, more particularly, to phase tracking as training fields grow in symbol duration.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than wireless ranges associated with frequency ranges of other IEEE 802.11 technologies and potentially fewer issues associated with path losses due to obstructions.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure provide an apparatus for wireless communications. The apparatus generally includes a processing system configured to generate a frame having one or more training fields with pilot symbols therein to be transmitted via one or more tones and an interface for outputting the frame for transmission.

Aspects of the present disclosure provide an apparatus for wireless communications. The apparatus generally includes an interface for obtaining a frame having one or more training fields with pilot symbols transmitted therein on one or more tones and a processing system configured to perform channel estimation for the frame based on the training fields and to perform phase tracking based on the pilot symbols.

Aspects of the present disclosure provide an apparatus for wireless communications. The apparatus generally includes a processing system configured to generate a frame having a plurality of orthogonal training field sequences, each orthogonal training field sequence assigned to a different spatial stream and an interface for outputting the frame for transmission as a single user (SU) transmission, a downlink multi-user (MU) multiple input multiple output (MIMO) transmission, or an orthogonal frequency division multiple access (OFDMA) transmission.

Aspects of the present disclosure provide an apparatus for wireless communications. The apparatus generally includes an interface for obtaining a frame having a plurality of orthogonal training field sequences, each orthogonal training field sequence assigned to a different spatial stream, the frame obtained as a single user (SU) transmission, a downlink multi-user (MU) multiple input multiple output (MIMO) transmission, or an orthogonal frequency division multiple access (OFDMA) transmission and a processing system configured to perform channel estimation for the frame based on the training field sequences and perform phase tracking based on the pilot symbols.

Aspects of the present disclosure also provide various methods, other apparatuses, and computer readable medium capable of performing the operations described above and herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 13 illustrates a table summarizing the pilot tone indices for different combinations of channel widths and RU size illustrated in FIGS. 10-12.

FIGS. 18-20 illustrate example tone index locations within resource units, in accordance with aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
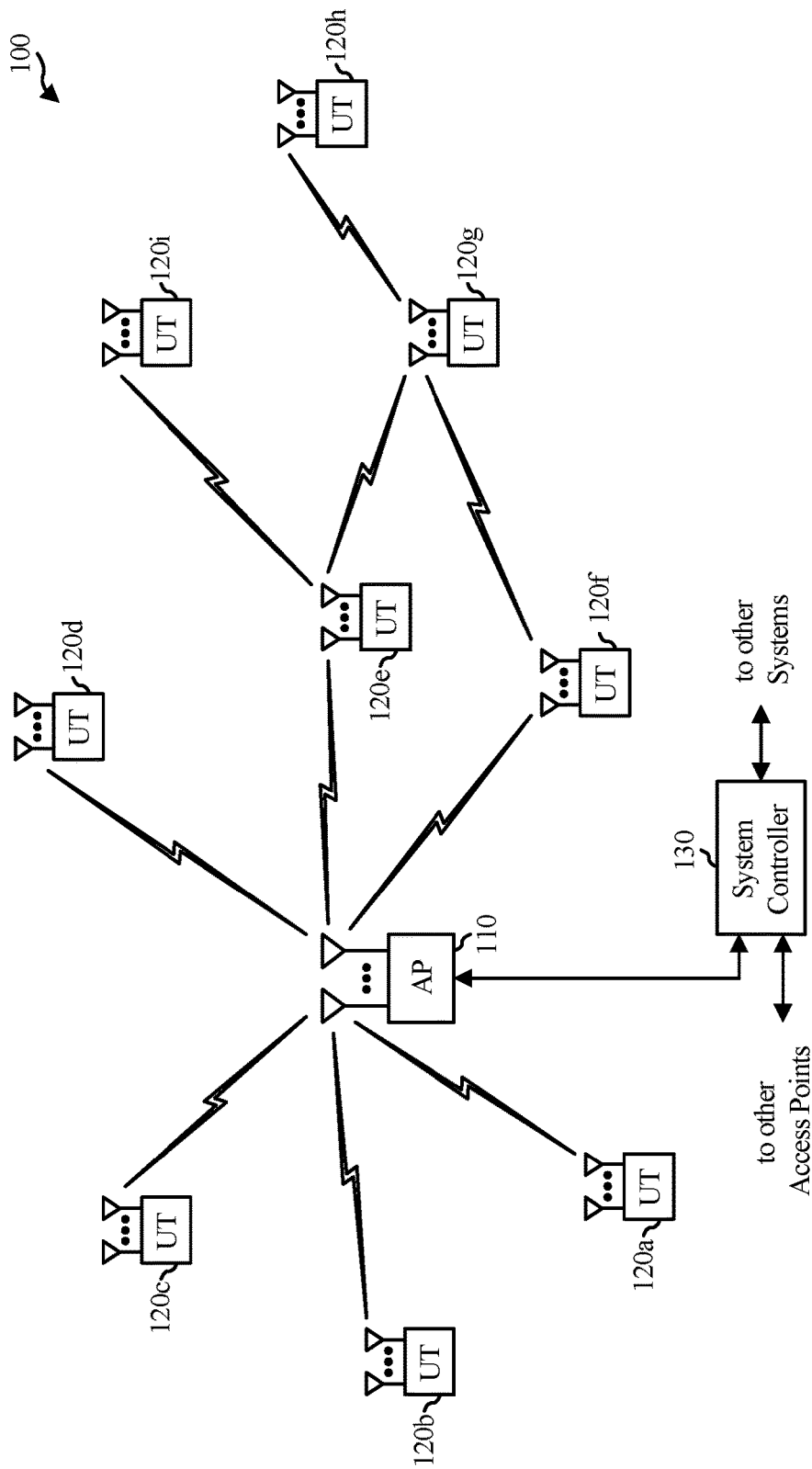
FIG. 1 illustrates a diagram of an example wireless communications network, in accordance with certain aspects of the present disclosure.

Aspects of the present disclosure generally relate to wireless communications and, more particularly, to techniques that may be used for tracking phase and/or carrier frequency offset (CFO) for wireless packets that utilize extended symbol durations (e.g., 2× and/or 4× symbol durations). The techniques may help determine what tones are allocated for transmitting pilot signals in LTFs that use extended symbol durations, such as 2× and 4× high efficiency (HE) LTFs. The allocation may be defined by what is commonly referred to as a "tone map" that indicates a number and location of tones to be used for transmitting pilot signals.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communications System

FIG. 1 illustrates a system 100 in which aspects of the disclosure may be performed. For example, any of the wireless stations including the access point 110 and/or the user terminals 120 may be in a neighbor aware network (NAN). Wireless stations may exchange fine timing measurement (FTM) information for ranging during a period when the wireless stations are already scheduled to wake up (e.g., during a paging window or data window) and may exchange the FTM information using existing frames (e.g., association frames, trigger/polling frames, probe request/ probe response frames). In aspects, one of the wireless devices may act as a ranging proxy.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
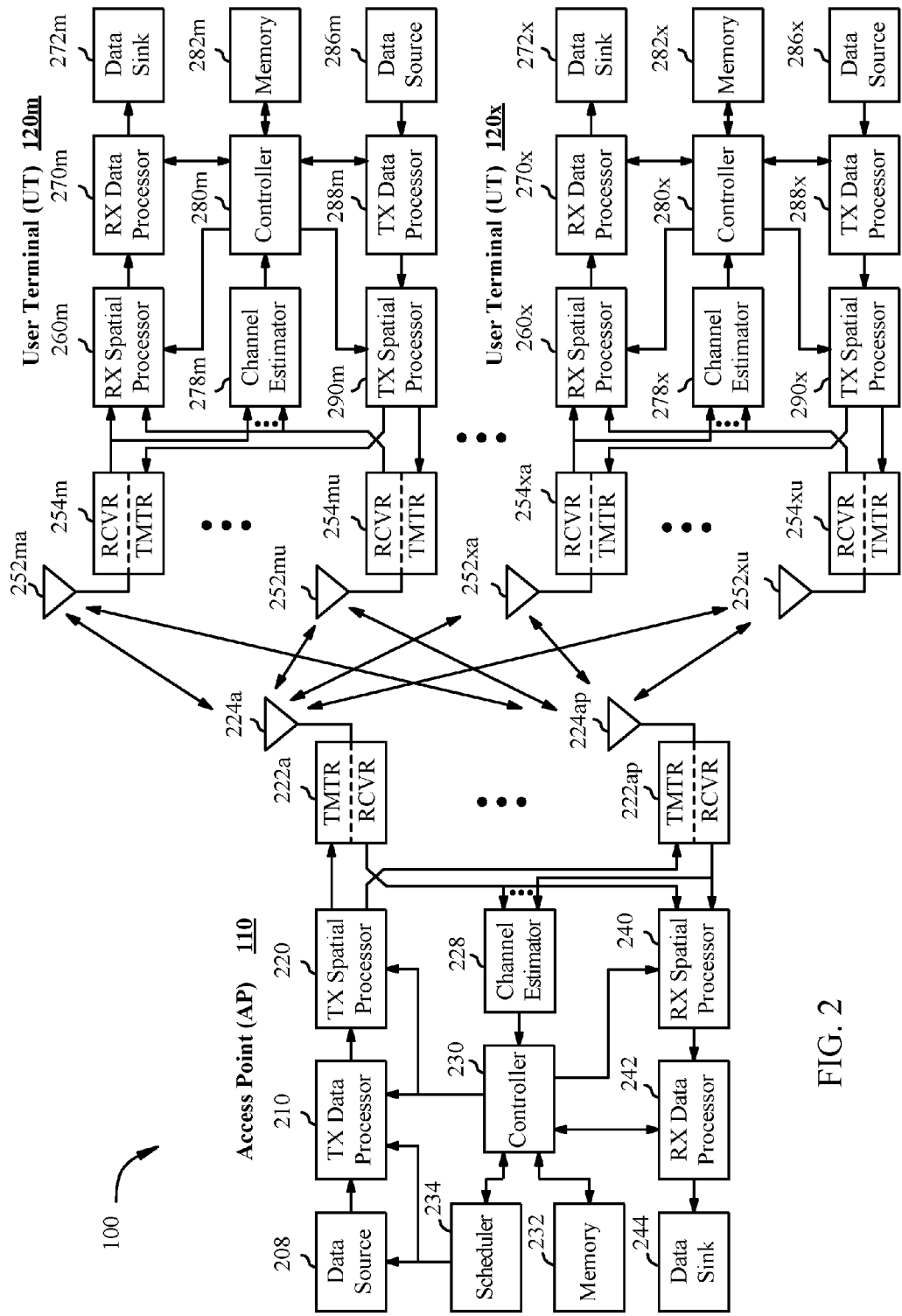
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, and/or processors 210, 220, 240, 242, of the AP 110, and/or controller 230 or antenna 252, Tx/Rx 254, processors 260, 270, 288, and 290, and/or controller 280 of UT 120 may be used to perform the operations 700 and 700A described herein and illustrated with reference to FIGS. 7 and 7A, respectively, and operations 900 and 900A described herein and illustrated with reference to FIGS. 9 and 9A, respectively.

FIG. 2 illustrates a block diagram of access point 110 two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
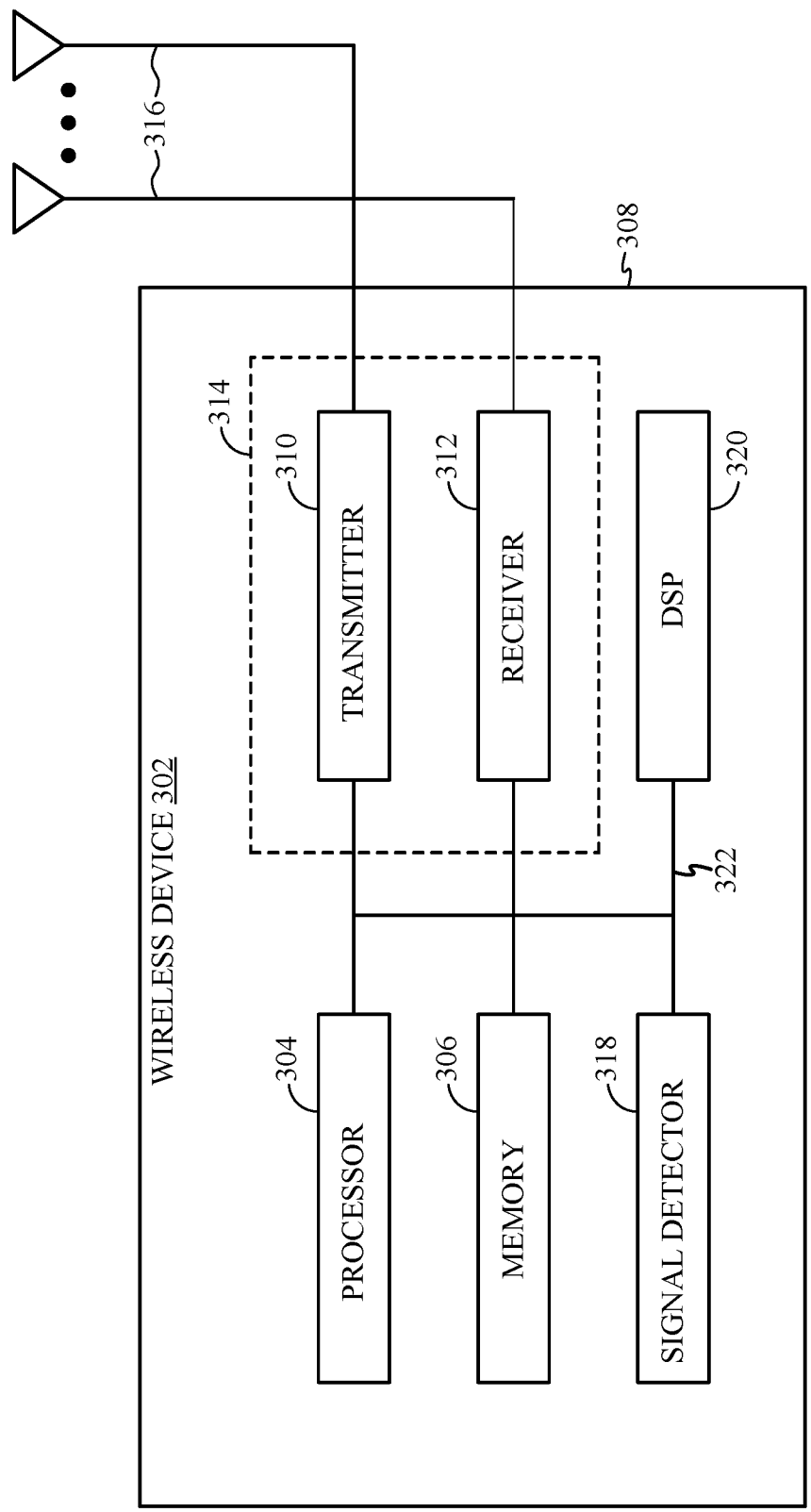
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 700 and 900 illustrated in FIGS. 7 and 9, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Tone Allocation

As described above, a packet (also referred to as a frame) may be communicated over a wireless medium using a waveform that is modulated over a fixed frequency band during a fixed period of time. The frequency band may be divided into one or more "tones" and the period of time may be divided into one or more "symbols." As an illustrative non-limiting example, a 20 MHz frequency band may be divided into four 5 MHz tones and an 80 microsecond period may be divided into twenty 4 microsecond symbols. Accordingly, a "tone" may represent a frequency sub-band included in a waveform. A tone may alternately be referred to as a subcarrier. A "tone" may thus be a frequency domain unit. A "symbol" may be a time domain unit representing a duration of time included in the waveform. Thus, the waveform for a wireless packet may thus be visualized as a two-dimensional structure that includes multiple tones (often on a vertical axis in units frequency) and multiple symbols (on a horizontal axis in units of time).

As an example, a wireless device may receive a packet via a 20 megahertz (MHz) wireless channel (e.g., a channel having 20 MHz bandwidth). The wireless device may perform a 64-point fast Fourier transform (FFT) to determine 64 tones in a waveform of the packet. A subset of the tones may be considered "useable" and the remaining tones may be considered "unusable" (e.g., may be guard tones, direct current (DC) tones, etc.). To illustrate, 56 of the 64 tones may be useable, including 52 data tones and 4 pilot tones. As another example, there may be 48 data tones and 4 pilot tones. It should be noted that the aforementioned channel bandwidths, transforms, and tone plans are for example. According to alternate embodiments, different channel bandwidths (e.g., 5 MHz, 6 MHz, 6.5 MHz, 40 MHz, 80 MHz, etc.), different transforms (e.g., 256-point FFT, 1024-point FFT, etc.), and/or different tone plans may be used.

Example Phase Tracking in HE-LTFs

Aspects of the present disclosure generally provide techniques that may be used for tracking phase and/or carrier frequency offset (CFO) for wireless packets that utilize extended symbol durations (e.g., 2× and/or 4× symbol durations). The techniques may help determine what tones are allocated for transmitting pilot signals in LTFs that use extended symbol durations, such as 2× and 4× high efficiency (HE) LTFs.

Figure 4:
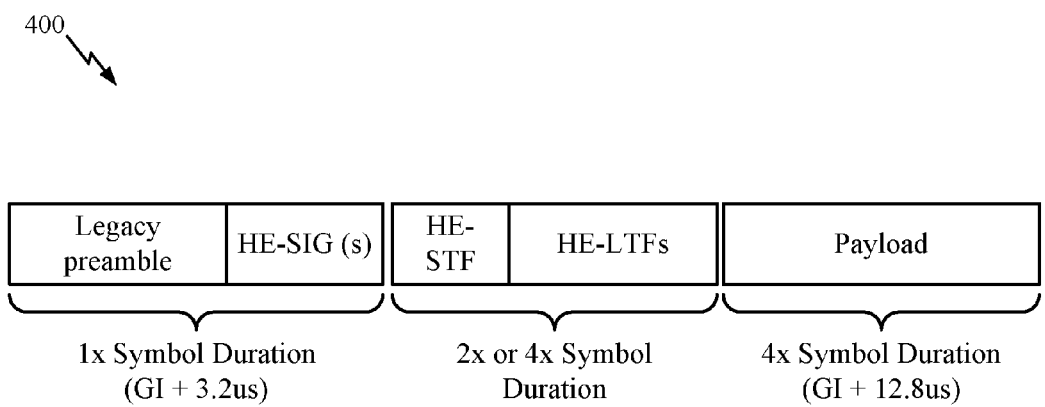
FIG. 4 illustrates an example frame structure with long training fields (LTFs), accordance with certain aspects of the present disclosure.

In some applications, longer symbol durations are used for various portions of a frame. For example, FIG. 4 shows an example packet 400, in which a longer symbol duration (e.g., 2× or 4×) is used for HE-LTFs as well as a subsequent data payload. This symbol duration is longer relative to a reference duration (e.g., a 1× symbol duration used for a legacy preamble portion and/or an HE-SIG field.

As longer symbol durations are used in various applications, phase tracking and carrier frequency offset (CFO) adjustments may be necessary due to differences between oscillators at transmitting and receiving devices. The increase in symbol duration for long training fields, such as HE-LTFs may make it desirable to perform phase tracking and/or CFO adjustments during channel estimation, given that HE-LTFs are longer (e.g., 2× or 4× longer) than other symbol durations (e.g., LTFs defined per 802.11ac).

Certain challenges may be presented when trying to apply an existing numerology (with the term numerology generally referring to or defining a "tone map" that specifies a number and location of tones used for transmitting data/pilot signals). For example, according to existing numerologies, 2×LTFs (2× a normal/reference symbol length) typically only populate every other tone in a 4×OFDM symbol (4× a normal/reference symbol length). This presents various options for deciding how to perform phase tracking, for example, for transmissions that have a single source to be tracked, such as single user (SU) transmissions, DL MU MIMO, as well as uplink and downlink OFDMA transmissions (e.g., where transmitters are assigned separate frequencies).

Aspects of the present disclosure provide various techniques for performing phase tracking during channel estimation using LTFs. In some cases, phase tracking may be performed through the use of pilots transmitted on various tones in LTF. In other cases, phase tracking may be performed without the use of pilots, but through the use of orthogonal LTF sequences.

Figure 5:
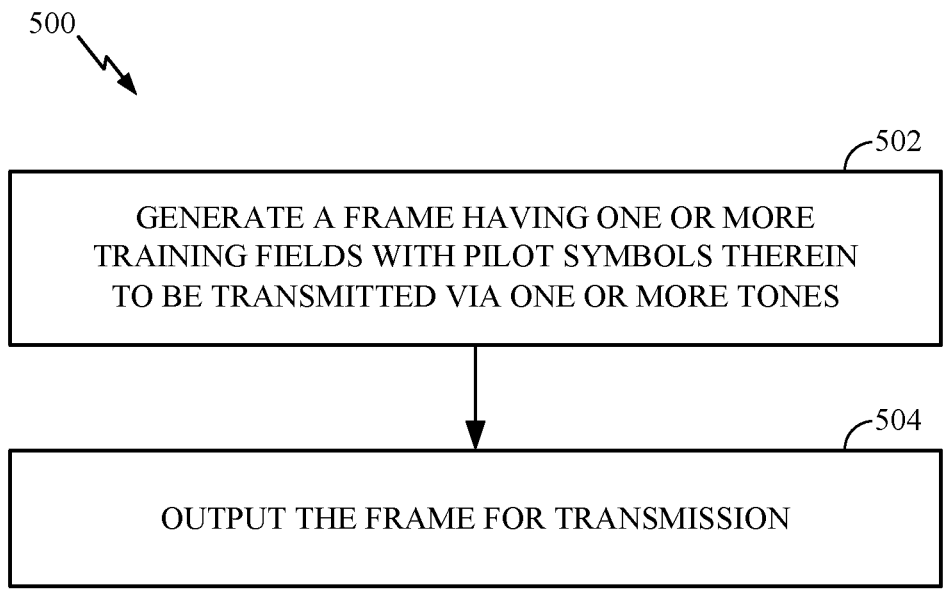
FIG. 5 illustrates a block diagram of example operations for wireless communications by a transmitting apparatus, in accordance with certain aspects of the present disclosure.

FIG. 5 illustrates a block diagram of example operations 500 for wireless communications by a transmitting apparatus, that allows for pilot-based phase tracking (by a receiving apparatus) using LTFs, in accordance with certain aspects of the present disclosure.

The operations 500 begin, at 502, by generating a frame having one or more fields (LTFs) with pilot symbols therein to be transmitted via one or more tones. At 504, the transmitting apparatus outputs the frame for transmission.

Figure 6:
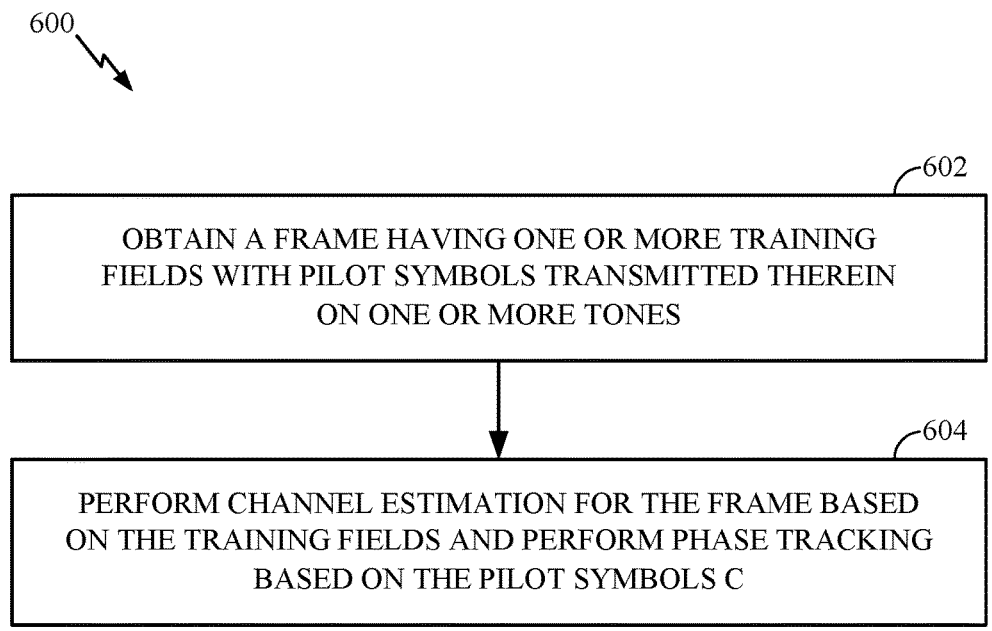
FIG. 6 illustrates a block diagram of example operations for wireless communications by a receiving apparatus, in accordance with certain aspects of the present disclosure.

FIG. 6 illustrates a block diagram of example operations 600 for wireless communications by a receiving apparatus, to perform pilot-based phase tracking in accordance with certain aspects of the present disclosure. For example, the operations 600 may be considered complementary "receiver-side" operations used to process a frame transmitted in accordance with the operations shown in FIG. 5.

The operations 600 begin, at 602, by obtaining a frame having one or more fields (LTFs) with pilot symbols transmitted therein on one or more tones. At 604, the receiving apparatus performs channel estimation for the frame based on the LTFs and performs phase tracking based on the pilot symbols.

According to certain aspects, for pilot-based phase tracking in LTF, existing tone plans may be used to determine what locations and/or numbers of tones to use for transmitting pilots. For example, for 4×LTF, a same tone plan for transmitting single stream pilots (SSPs or SSP pilot symbols) in a data portion of a packet may be used. In this case, a same number of pilots and pilot tone locations may be used in LTFs as used in data.

As noted above, however, there may be different considerations for 2×LTFs, for example, because 2×LTFs may be generated by only populating every other tone of a 4×OFDM symbol (and in existing 4× data symbols, pilot tones may all have odd indexes). Aspects of the present disclosure, however, may provide a pilot design in 2×LTF that utilizes a number and location of (e.g., single stream) pilots that allows for an acceptable tracking performance.

Various approaches are presented that accommodate 2×LTFs where the pilot positions are not aligned during a data portion of a packet and LTF. For example, according to one approach, a 2× numerology may be used in LTF for pilots. In another approach, a same number of pilots may be used as in 4×LTF numerology.

Using a 2× numerology in 2×LTF for pilots may result in more than half the number of pilot tones in 4×, which represents an increase in pilot density relative to 4× numerology. As a result, such an approach may be expected to have phase tracking performance no worse than 4×LTF. In this case, it may not be necessary to further reduce number of pilots, which may avoid the need for a new pilot tone plan. In some cases, the number of pilot tones and pilot locations in 2×LTF may follow one of the following 2× numerologies:

- 80 MHz: 16 pilots and their location as in 512 FFT (HE40)
- 40 MHz: 8 pilots and their location as in 256 FFT (HE20)
- 20 MHz: 6 pilots and their location as in 128 FFT (VHT40)
- 106-tone RU (resource unit): 4 pilots and their location as in 52-tone RU
- 52-tone RU: 2 pilots and their location as in 26-tone RU
- 26-tone RU: new tone plan for 13 tone block For the new (13-tone) tone block, in some cases, a single (1) pilot tone may be used in the center (of the 13-tone block), considering the channel should typically be relatively flat over this block (and the same pilot power may be used as 2 pilots in 26-tone RU). In other cases, rather than a single tone in the middle, multiple pilot tones may be used (e.g., 2 pilot tones in the 5th and 9th tone in that 13 tone block), to provide better diversity gain and power gain.

In some cases, when using a 2× numerology in 2×LTF for pilots, in order to minimize extrapolation loss in channel estimates for 4× data, the number of populated (usable) 2×LTF tones may be extended at (closer to) an edge or both edges. This example numerology may be referred to as an "extended" 2× numerology.

In some cases, except the new 13 tone block for 2×LTF for 26 tone RU, all others RUs may use existing numerologies, which are already defined (e.g., for 802.11ac/11ah). In such an application, pilots are for phase tracking between 2×LTF to 2×LTF, rather than between 2× to 4×, so there may be no additional complexity with phase tracking. While pilot positions may not be aligned during data and LTF, such alignment may not be necessary, as phase offset in the data symbol may be estimated with respect to estimated channel instead of pilots in LTF, and channel interpolation is typically needed when transmitting 2×LTF.

As noted above, in some cases, a same number of pilots may be used in 2×LTF as in 4×LTF. In current 4× numerology, pilot tones all have odd indexes. Therefore, to have a same number of pilots in 2×LTF as in 4×, pilot locations may be shifted in 4×LTF to even tone index, so they can all be populated in 2×LTF. As noted above, further shift pilots locations during data to align all the pilot indexes in LTF and data may not be necessary, but may help keep consistency in pilots for both LTF and data. Using a same number of pilots in 2×LTF as in 4×LTF may result in new pilot tone plans for 2× and 4× numerology. More pilots in LTF may result in more channel interpolations needed for those data tones around pilot tone locations.

In some cases, the number of pilot tones in 2×LTF may be the same as in 4× numerology. In such cases, pilot location in 2×LTF and 4× data (if needed) may follow (existing 4× pilot tone indexes+1) or (existing 4× pilot tone indexes−1), with exact pilot location in 2×LTF being equal to the modified 4× pilot indexes divided by 2, such as:

- 2×LTF for 80 MHz: 16 pilots and their location is (pilot tone indexes in 1024FFT+/−1)/2
- 2×LTF for 40 MHz: 16 pilots and their location is (pilot tone indexes in 512FFT+/−1)/2
- 2×LTF for 20 MHz: 8 pilots and their location is (pilot tone indexes in 256FFT+/−1)/2
- 2×LTF for 106-tone RU: 4 pilots and their location is (pilot tone indexes in 106-tone RU+/−1)/2
- 2×LTF for 52-tone RU: 4 pilots and their location is (pilot tone indexes in 52-tone RU+/−1)/2
- 2×LTF for 26-tone RU: 2 pilots and their location is (pilot tone indexes in 26-tone RU+/−1)/2

Figure 7:
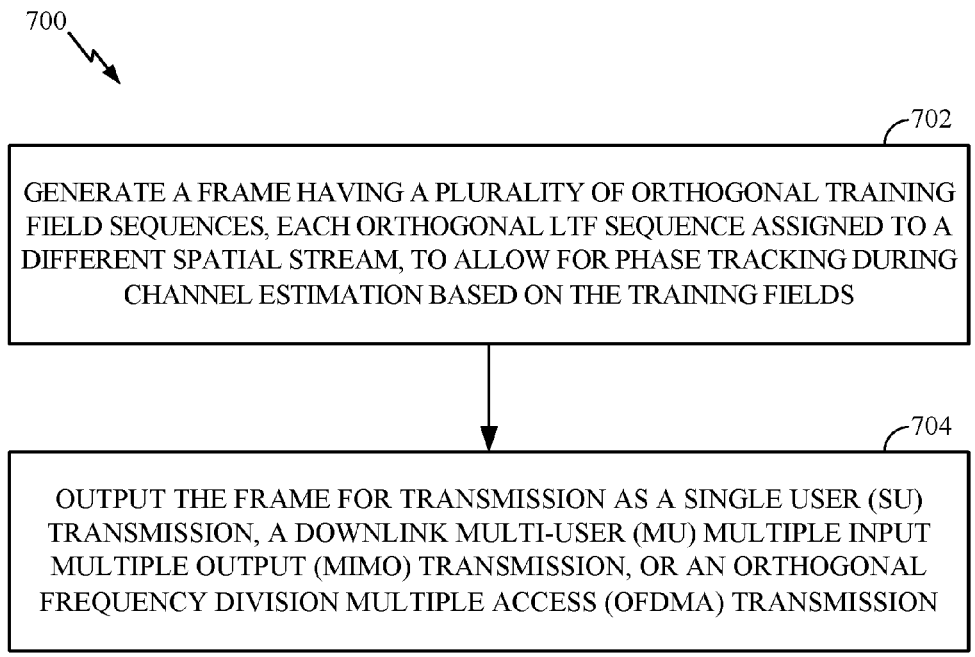
FIG. 7 illustrates a block diagram of example operations for wireless communications by a transmitting apparatus, in accordance with certain aspects of the present disclosure.
Figure 7A:
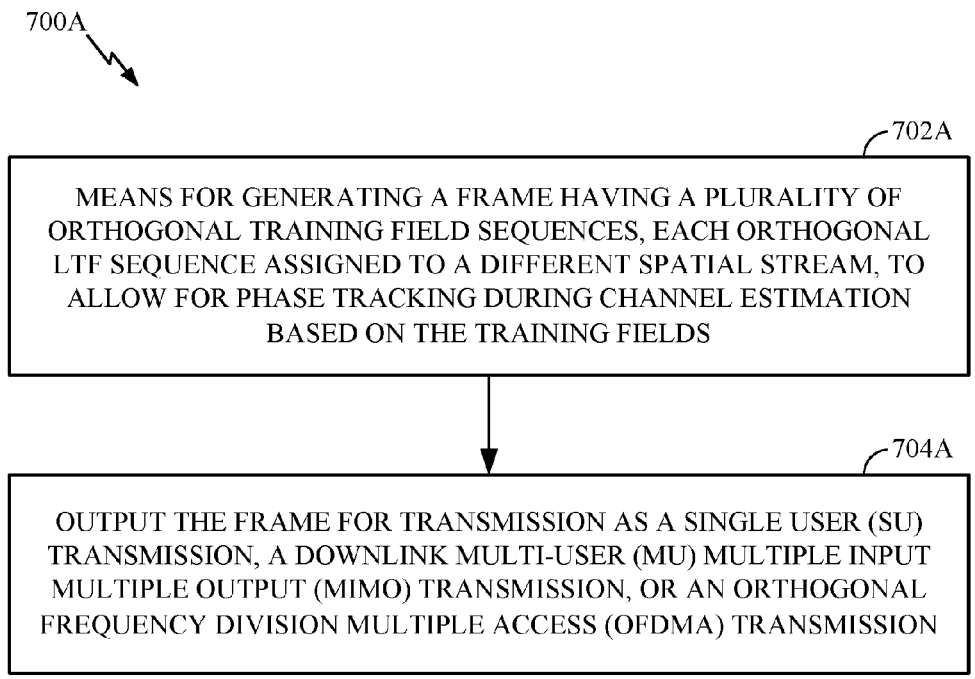
FIG. 7A illustrates example means capable of performing the operations shown in FIG. 7.

FIG. 7 illustrates a block diagram of example operations 700 for wireless communications by a transmitting apparatus, that allows for non-pilot-based phase tracking using LTFs, in accordance with certain aspects of the present disclosure.

The operations 700 begin, at 702, by generating a frame having a plurality of orthogonal long training field (LTF) sequences, each orthogonal LTF sequence assigned to a different spatial stream, to allow for phase tracking during channel estimation based on the LTFs. At 704, the transmitting apparatus outputs the frame for transmission as a single user (SU) transmission, a downlink multi-user (MU) multiple input multiple output (MIMO) transmission, or an orthogonal frequency division multiple access (OFDMA) transmission.

Figure 8:
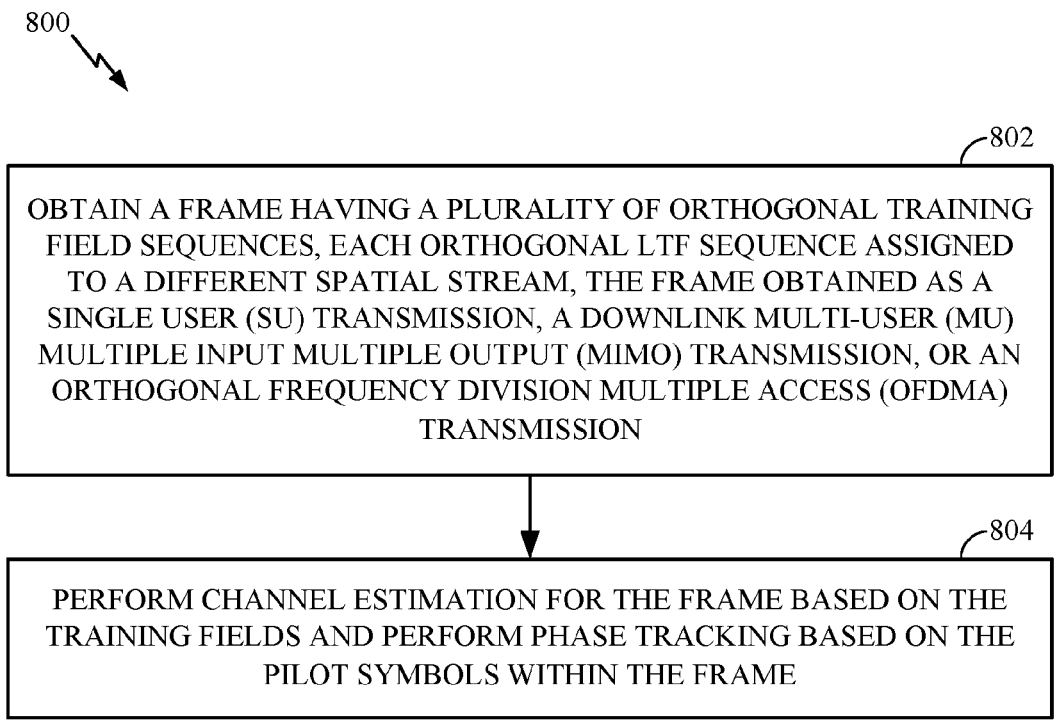
FIG. 8 illustrates a block diagram of example operations for wireless communications by a receiving apparatus, in accordance with certain aspects of the present disclosure.
Figure 8A:
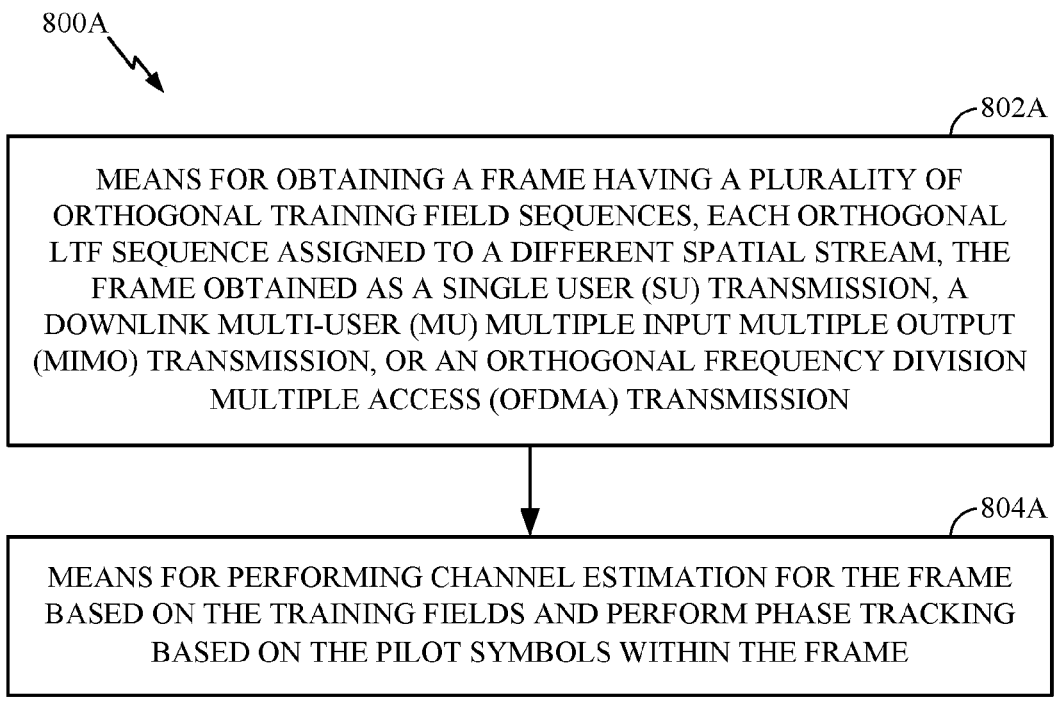
FIG. 8A illustrates example means capable of performing the operations shown in FIG. 8.

FIG. 8 illustrates a block diagram of example operations 800 for wireless communications by a receiving apparatus, to perform non pilot-based phase tracking in accordance with certain aspects of the present disclosure. For example, the operations 800 may be considered complementary "receiver-side" operations used to process a frame transmitted in accordance with the operations shown in FIG. 7.

The operations 800 begin, at 802, by obtaining a frame having a plurality of orthogonal long training field (LTF) sequences, each orthogonal LTF sequence assigned to a different spatial stream, the frame obtained as a single user (SU) transmission, a downlink multi-user (MU) multiple input multiple output (MIMO) transmission, or an orthogonal frequency division multiple access (OFDMA) transmission. At 804, the receiving apparatus performs at least one of channel estimation for the frame or phase tracking based on the LTFs.

When using Orthogonal LTF sequences across streams, different LTF sequences may be assigned to different streams. In this case, all data tones and at least "the first+the last" LTF symbols may be used to estimate carrier frequency offset (CFO). This approach may be advantageous in that no pilots are needed in LTF and may result in more accumulation gain from larger number of LTF tones comparing to the pilot tones in LTF. Orthogonal LTF sequences may also be applicable to both 2× and 4×LTF.

In some cases, Nss orthogonal LTF sequences may be used for Nss streams (a 1-to-1 mapping). This approach may result in full combining gain, but may also require at least Nss adjacent tones to have same channel. In other cases, less than Nss orthogonal LTF sequences may be used. For example, only two orthogonal LTF sequences may be used: one for the 1st stream, the other for the remainder (e.g., the remaining Nss−1) of the streams. This approach may reduce the need for a flat channel to over only adjacent two tones, but may also result in a loss of averaging of estimated phase drift over multiple streams (e.g., when >2 stream for one user) and may result in power loss, at times, due to being stick to just one stream for tracking.

In some scenarios, for phase tracking purpose, single stream pilots may provide better performance than orthogonal LTF, for example, for MIMO transmissions in a frequency selective channel at medium to high SNR. In such cases, from a channel interpolation point of view, channel loss around pilots may be higher than other tones, but may not has significant impact due to limited pilot density.

In such cases, however, certain techniques may be employed for channel interpolation at pilots, when beamforming. Such techniques may be used when generating a precoding matrix (used for beamformed transmissions) based on feedback from a device receiving the pilots. In some cases, to make precoded channel smooth, the precoding matrix entry that corresponds to a particular pilot tone may be generated based on feedback for channels transmitted on other tones. For example, a precoding matrix for a pilot tone with tone index n may be generated based on the interpolated channel feedback on two adjacent tones (with tone indexes n−1 and n+1):

$$W(H(n))=f(H(n-1),H(n+1)).$$

In some cases, consideration may be given as to how to place pilot tones in a given resource unit (RU), so that they can be used for 2×LTF. One approach is to place pilots in all RUs at even tones. This may actually imply the use of two pilot structures in mirrored symmetry, which might not lead to a consistent design and may still require knowledge of RU location to decide pilot structure. In general, it may be difficult or impossible for one pilot structure to achieve the goal of having even tone indexes for all pilots. In some cases, both spectrum line and RU location may have mirror symmetry.

In some cases, as noted above, pilot tone locations may be based on a relative pilot structure within each RU. In this case, separate pilot structures may be used for LTF and data (e.g., by reusing conventional numerology for 2× and 4×), such that 2×LTF uses 2× pilots, while 4×LTF and data use 4× pilots.

Another option is to use a fixed absolute pilot structure for the whole PPDU. In this case, pilot tone locations may be selected (e.g., a device may select) based on a defined set of pilots in fixed tone locations (e.g. all at even tone indexes) in a given PPDU bandwidth (e.g., 20/40/80 MHz) to be used for any resource allocation scheme. For each allocation, pilot tones within the allocated RU may be selected according to the defined set, with proper puncturing to adapt to RU size.

As a particular, but not limiting example, 18 pilots at fixed locations may be defined in 20 MHz PPDU to accommodate up to 9 users allocation, each with 2 pilots in 26-RU. Assuming one STA is assigned a 106 RU, within this 106 RU, there would be 8 pilots. To obtain 4 pilots out of the 8 for 106 RU, every other pilot may be punctured (e.g., according to/by applying any suitable puncturing rule).

One advantage to a fixed absolute pilot structure for the whole PPDU is that pilot locations may be aligned in any RUs and any allocation, which may facilitate hardware design. Further, having pilot locations that are independent of RU design and resource allocation may make OFDMA processing simpler. As an example, if all pilots defined are at even tones, 2× and 4× transmissions would use same set of pilots for LTF which makes LTF processing simpler. Having fixed absolute pilots structure may be beneficial for downlink common pilot usage.

Figures 9, 10:
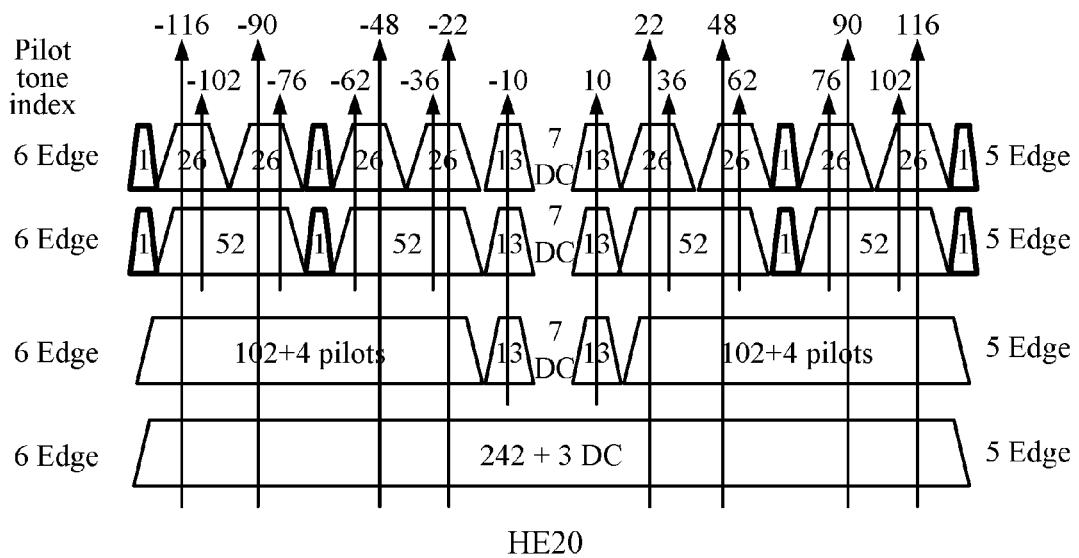
FIG. 9 illustrates an example absolute tone structure, in accordance with aspects of the present disclosure.
FIGS. 10-12 illustrate example plots of the absolute tone structure of FIG. 9, in accordance with aspects of the present disclosure.

FIG. 9 illustrates one example of a fixed absolute pilot structure. The illustrate example proposes 18 pilots in 20 MHz, 36 pilots in 40 MHz, and 74 pilots in 80 MHz. In the illustrated example, all pilots are placed at even tones, and evenly spread over entire spectrum line of PPDU.

In the illustrated example, proposed pilot tone indexes for 20 MHz are: ±10, ±22, ±36, ±48, ±62, ±76, ±90, ±102, ±116. For 40 MHz, proposed tone indexes are: ±10, ±24, ±36, ±50, ±64, ±78, ±90, ±104, ±116, ±130, ±144, ±158, ±170, ±184, ±198, ±212, ±224, ±238. For 80 MHz, proposed tone indexes are: ±10, ±24, ±38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494.

Figure 11:
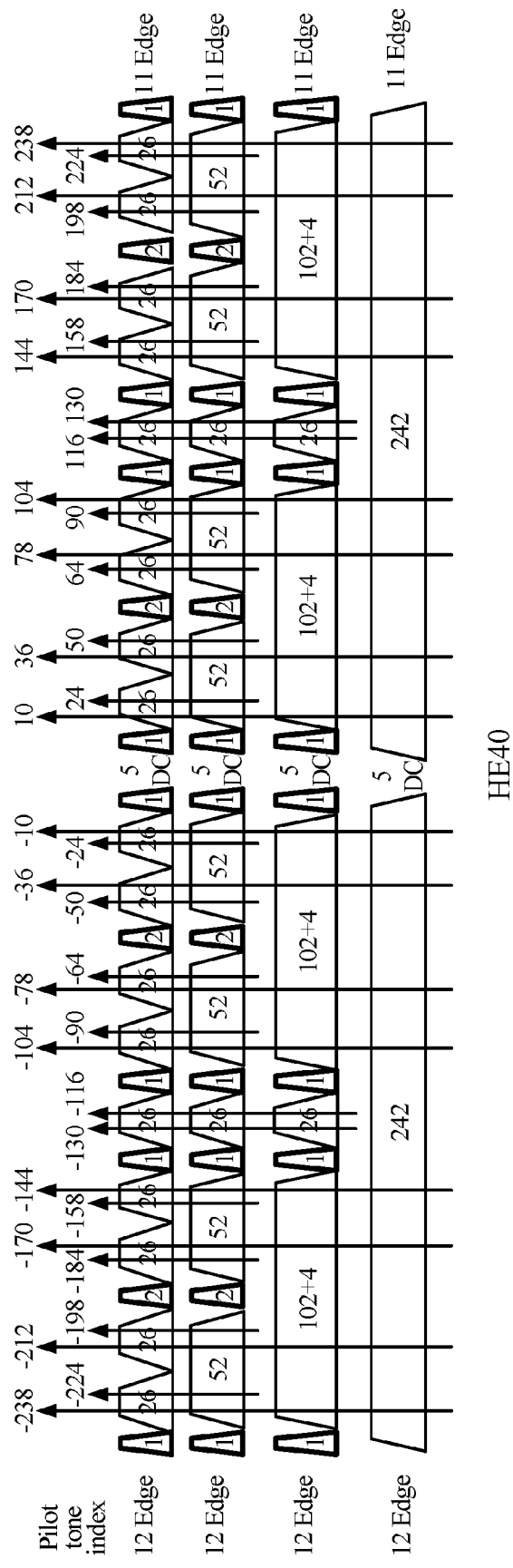
Figure 12:
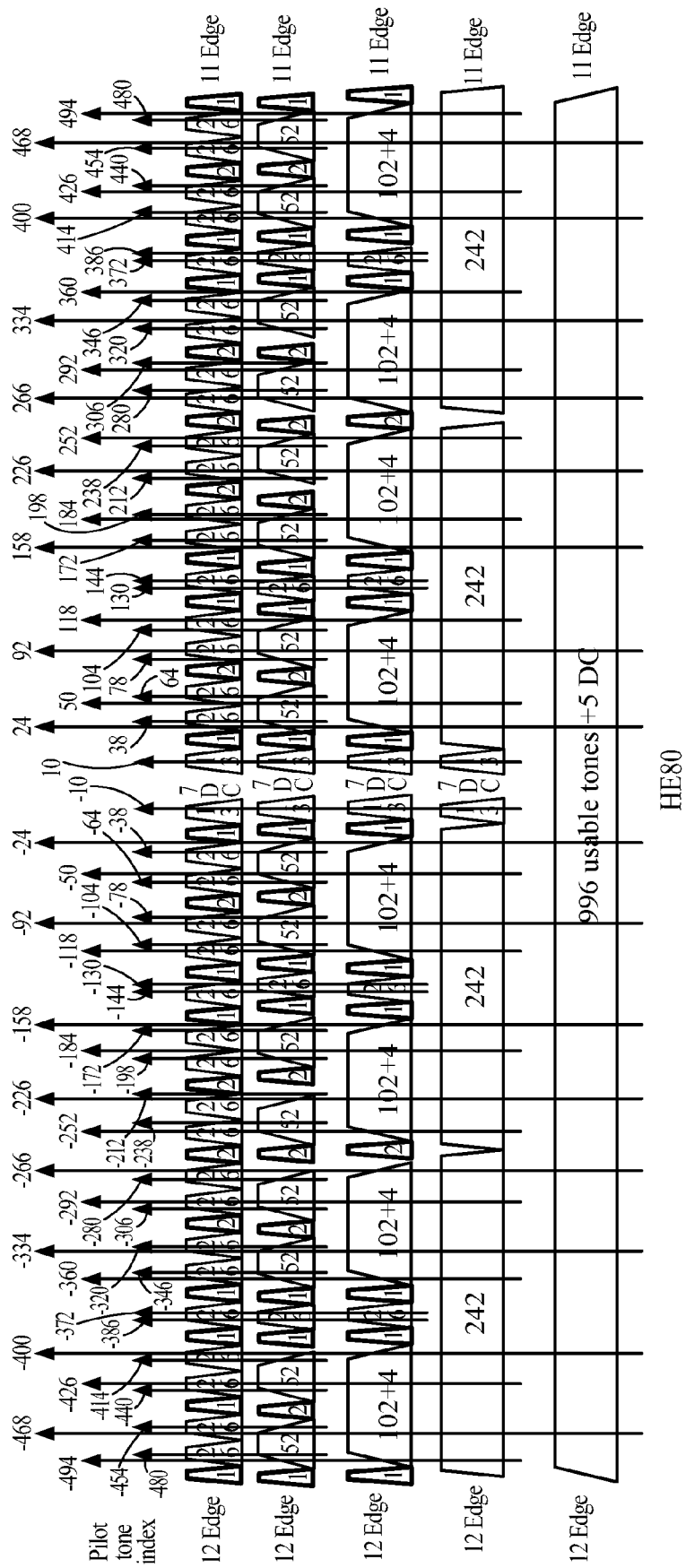

FIGS. 10-12 illustrate example plots of the absolute tone structure of FIG. 9, in accordance with aspects of the present disclosure. FIG. 10 illustrates an example tone map of 18 pilots in 20 MHz, FIG. 11 illustrates an example tone map of 36 pilots in 40 MHz, while FIG. 12 illustrates an example tone map of 74 pilots in 80 MHz.

Figures 14, 15:
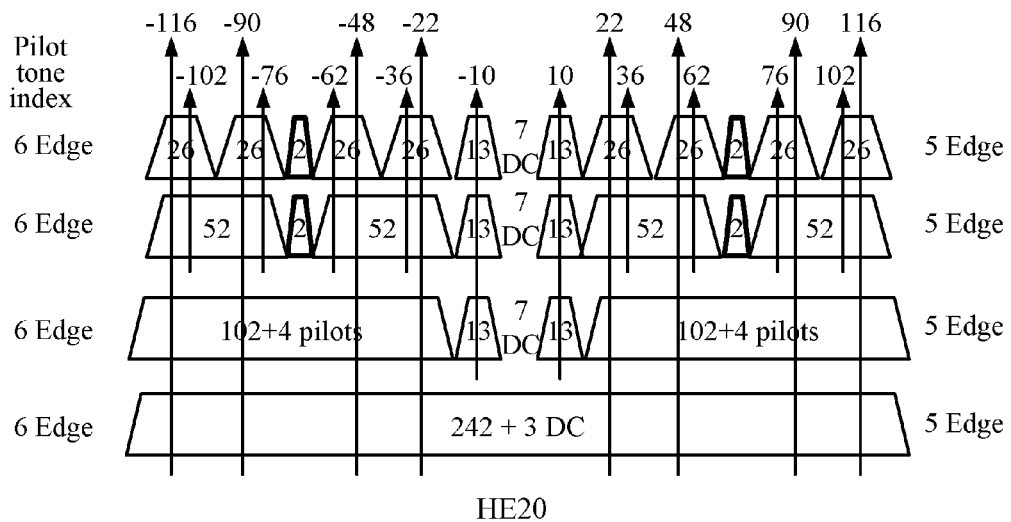
FIG. 14 illustrates an example absolute tone structure, in accordance with aspects of the present disclosure.
FIGS. 15-17 illustrate example plots of the absolute tone structure of FIG. 9, in accordance with aspects of the present disclosure.

FIG. 14 illustrates another example absolute tone structure (an alternative to the structure shown in FIG. 9), in accordance with aspects of the present disclosure. In the illustrated example, proposed pilot tone indexes for 20 MHz are the same as those shown in FIG. 9. For 40 MHz, proposed tone indexes are: ±8, ±22, ±34, ±48, ±62, ±76, ±88, ±102, ±116, ±130, ±144, ±158, ±170, ±184, ±198, ±212, ±224, ±238. For 80 MHz, proposed tone indexes are: ±10, ±22, ±36, ±48, ±62, ±76, ±90, ±102, ±116, ±130, ±144, ±158, ±172, ±184, ±198, ±212, ±226, ±238, ±252, ±264, ±278, ±290, ±304, ±318, ±332, ±344, ±358, ±372, ±386, ±400, ±414, ±426, ±440, ±454, ±468, ±480, ±494.

Similar to FIGS. 10-12, FIGS. 15-17 illustrate example plots of the absolute tone structure of FIG. 14, in accordance with aspects of the present disclosure. The plots shown in FIGS. 10-12 and 15-17 illustrate how to use and puncture the defined pilots in each of the example RUs, given certain leftover tone (yellow blocks) and RU locations. Leftover tones may also be referred to as "null tones" as these tones may have no energy.

In general, for 26 and 52 tone RUs, all available pilots in each RU may be used. For a 106 (i.e. 102+4) and 242 tone RUs, half of the available pilot tones may be punctured. As illustrated in FIG. 18, in some cases, relative pilot positions may be kept relatively close to what is defined in 11ah (with a symmetric pilot structure of one even and one odd pilot indexes. Regardless of leftover tone allocation plan, there may be three variations of pilot tone position within 26 tone RU, as shown in FIG. 19. In a first variation, a 26 tone RU may have a left most tone starting from even index and may use a structure of [6P13P5]. In a second variation, a left most tone may start from odd index may need structure of [5P13P6]. In a third variation, a center 26 tone RU pilot structure may be [6P6 6P6].

To ensure all pilots with even tone indices, relative pilot location within 26 tone RU has to be varied for different 26 tone RUs For example, referring to FIG. 10, for 20 MHz, pairs of pilot tone indexes (indicated by arrows) may be selected for each 26 tone RU (from left to right, −116/−102, −90/−76, −62/−48, −36/−22, −10/10, 22/36, 48/62, 76/90, and 102/116). Similarly, sets of four of these same pilot tone indexes may be used for 52 tone RUs (−116/−102/−90/−76, −62/−48/−36/−22, 22/36/48/62, and 76/90/102/116). On the other hand, only half of these tone indexes may be selected for 106 tone RUs (−116/−90/−48/−22 and 22/48/90/116) and 242 tone RUs (−116/−90/−48/−22/22/48/90/116), while other pilot tone indices are punctured (from left to right, −102, −76, −62, −36, −10, 10, 36, 62, 76, and 102).

Similarly, referring to FIG. 11, for 40 MHz, pairs of pilot tone indexes (indicated by arrows) may be selected for each 26 tone RU (from left to right, −238/−224, −212/−198, −184/−170, −158/−144, −130/−116, −104/−90, −78/−64, −50/−36, −24/−10, 10/24, 36/50, 64/78, 90/104, 116/130, 144/158, 170/184, 198/212, and 224/238). Similarly, sets of four of these same pilot tone indexes may be used for 52 tone RUs (−238/−224/−212/−198, −184/−170/−158/−144, −104/−90/−78/−64, −50/−36/−24/−10, 10/24/36/50, 64/78/ 90/104, 144/158/170/184, and 198/212/224/238). On the other hand, less than half of these tone indexes may be selected for 106 tone RUs (−238/−212/−170/−144, −104/−78/−36/−10, 10/36/78/104, and 144/170/212/238) and 242 tone RUs (−238/−212/−170/−144/−104/−78/−36/−10 and 10/36/78/104/144/170/212/238) while other pilot tone indices are punctured.

Similarly, referring to FIG. 12, for 80 MHz, pairs of pilot tone indexes (indicated by arrows) may be selected for each 26 tone RU (from left to right, −494/−480, −468/−454, −440/−426, −414/−400, −386/−372, −360/−346, −334/−320, −306/−292, −280/−266, −252/−238, −226/−212, −198/−184, −172/−158, −144/−130, −118/−104, −92/−78, −64/−50, −38/−24, −10/10, 24/38, 50/64, 78/92, 104/118, 130/144, 158/172, 184/198, 212/226, 238/252, 266/280, 292/306, 320/334, 346/360, 372/386, 400/414, 426/440, 454/468, and 480/494). Similarly, sets of four of these same pilot tone indexes may be used for 52 tone RUs (from left to right, −494/−480/−468/−454, −440/−426/−414/−400, −360/−346/−334/−320, −306/−292/−280/−266, −252/−238/−226/−212, −198/−184/−172/−158, −118/−104/−92/−78, −64/−50/−38/−24, 24/38/50/64, 78/92/104/118, 158/172/184/198, 212/226/238/252, 266/280/292/306, 320/334/346/360, 400/414/426/440, and 454/468/480/494). On the other hand, only half or less of these tone indexes may be selected for 106 tone RUs (−494/−468/−426/−400, −360/−334/−292/−266, −252/−226/−184/−158, −118/−92/−50/−24, 24/50/92/118, 158/184/226/252, 266/292/334/360, and 400/426/468/494) and 242 tone RUs (−494/−468/−426/−400/−360/−334/−292/−266, −252/−226/−184/−158/−118/−92/−50/−24, 24/50/92/118/158/184/226/252, and 266/292/334/360/400/426/468/494), while other pilot tone indices are punctured. On the other hand, only quarter or less of these tone indexes may be selected for 996 tone RUs (−468/−400/−334/−266/−226/−158/−92/−24, 24/92/158/226/266/334/400/468), while other pilot tone indices are punctured.

The table shown in FIG. 13 summarizes the pilot tone indices for different combinations of channel widths and RU size illustrated in FIGS. 10-12. In other words, depending on the channel width and RU size, a suitable number of pilot tone indices may be selected from the values shown in the table (e.g., a pair of the indicated tone indices for a 26-tone RU or 4 of the indicated tone indices for a 52-tone RU).

Referring to FIG. 15, for the 20 MHz tone mapping shown in FIG. 14, pilot tone indexes selected for different RUs may be the same as shown in FIG. 10

Figure 16:
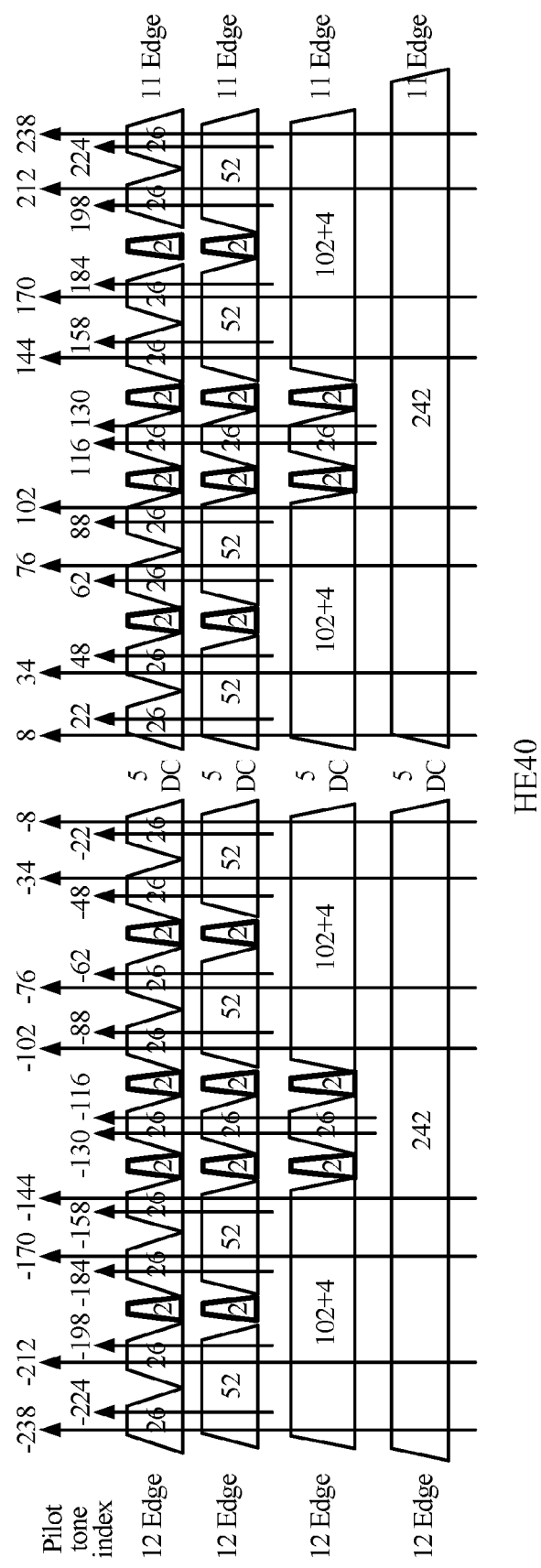

Similarly, referring to FIG. 16, for the 40 MHz tone mapping shown in FIG. 14, pairs of pilot tone indexes (indicated by arrows) may be selected for each 26 tone RU (from left to right, −238/−224, −212/−198, −184/−170, −158/−144, −130/−116, −102/−88, −76/−62, −48/−34, −22/−8, 8/22, 34/48, 62/76, 88/102, 116/130, 144/158, 170/184, 198/212, and 224/238). Similarly, sets of four of these same pilot tone indexes may be used for 52 tone RUs (−238/−224/−212/−198, −184/−170/−158/−144, −102/−88/−76/−62, −48/−34/−22/−8, 8/22/34/48, 62/76/88/102, 144/158/170/184, and 198/212/224/238). On the other hand, less than half of these tone indexes may be selected for 106 tone RUs (−238/−212/−170/−144, −102/−76/−34/−8, 8/34/76/102, and 144/170/212/238) and 242 tone RUs (−238/−212/−170/−144/−102/−76/−34/−8 and 8/34/76/102/144/170/212/238) while other pilot tone indices are punctured.

Figure 17:
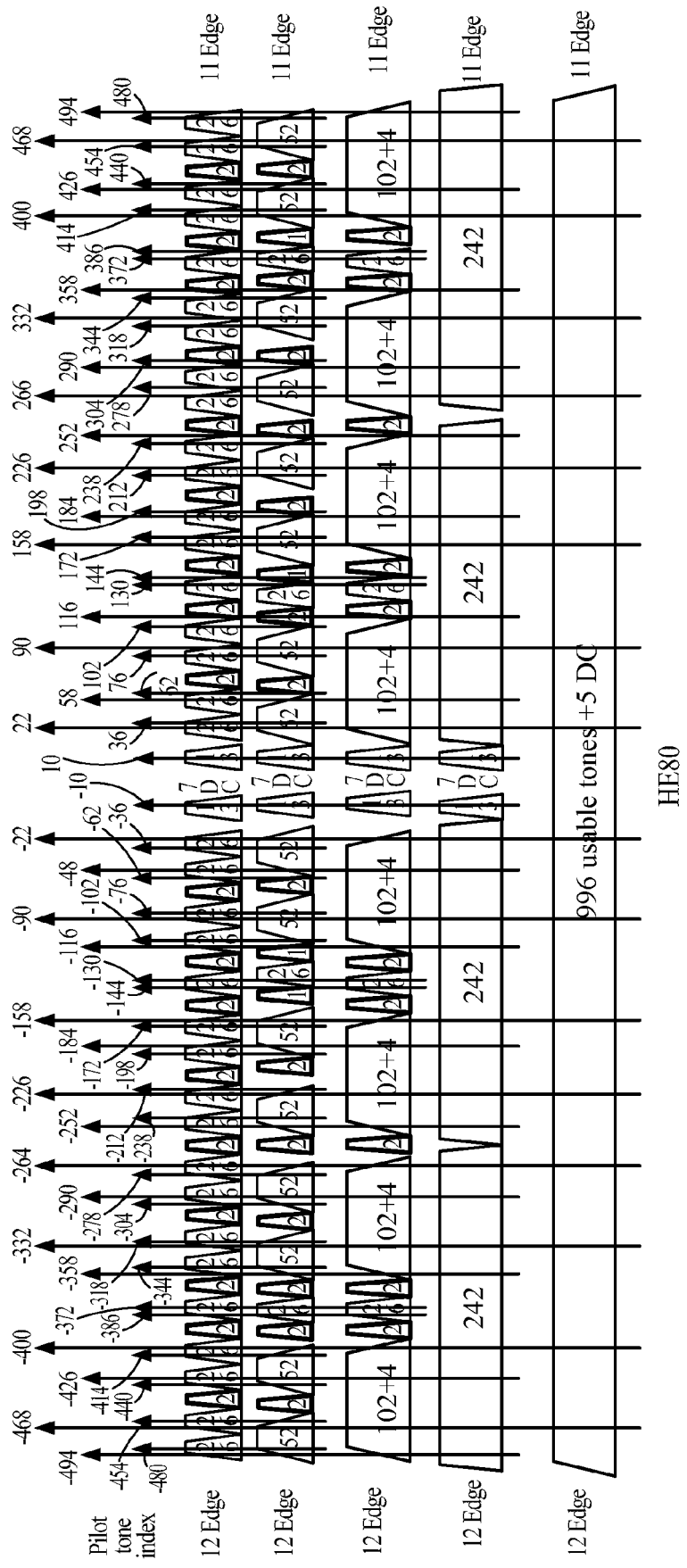

Similarly, referring to FIG. 17, for 80 MHz, pairs of pilot tone indexes (indicated by arrows) may be selected for each 26 tone RU (from left to right, −494/−480, −468/−454, −440/−426, −414/−400, −386/−372, −358/−344, −332/−318, −304/−290, −278/−264, −252/−238, −226/−212, −198/−184, −172/−158, −144/−130, −116/−102, −90/−76, −62/−48, −36/−22, −10/10, 22/36, 48/62, 76/90, 102/116, 130/144, 158/172, 184/198, 212/226, 238/252, 264/278, 290/304, 318/332, 344/358, 372/386, 400/414, 426/440, 454/468, and 480/494). Similarly, sets of four of these same pilot tone indexes may be used for 52 tone RUs (from left to right, −494/−480/−468/−454, −440/−426/−414/−400, −358/−344/−332/−318, −304/−290/−278/−264, −252/−238/−226/−212, −198/−184/−172/−158, −116/−102/−90/−76, −62/−48/−36/−22, 22/36/48/62, 76/90/102/116, 158/172/184/198, 212/226/238/252, 264/278/290/304, 318/332/344/358, 400/414/426/440, and 454/468/480/494). On the other hand, only half or less of these tone indexes may be selected for 106 tone RUs (−494/−468/−426/−400, −358/−332/−290/−264, −252/−226/−184/−158, −116/−90/−48/−22, 22/48/90/116, 158/184/226/252, 264/290/332/358, and 400/426/468/494) and 242 tone RUs (−494/−468/−426/−400/−358/−332/−290/−264, −252/−226/−184/−158/−116/−90/−48/−22, 22/48/90/116/158/184/226/252, and 264/290/332/358/400/426/468/494), while other pilot tone indices are punctured. On the other hand, only quarter or less of these tone indexes may be selected for 996 tone RUs (−468/−400/−332/−264/−226/−158/−90/−22, 22/90/158/226/264/332/400/468), while other pilot tone indices are punctured.

As illustrated in these examples, in many cases, the pilots of 52 tone RUs may be aligned with the pilots in corresponding 2×26 tone RUs. Also, as illustrated in these examples, the indices of larger RUs may be chosen from pilot indices of smaller RUs (e.g., 106 tone RU pilots may be chosen from the pilot indices of corresponding 2×52 tone RUs), as illustrated in FIG. 20.

In the illustrated examples, the puncturing is performed in a mirror symmetric way within 242 tones, for example, to make it more evenly spread within 996 tone RU in 80 MHz. For a 996 tone RU, every other pilot may be inherited from 242 RUs, to make good pilot alignment between RUs. In the illustrated examples, the same puncture rule is applied for 20/40/80 MHz. Of course, this is an example only, and various different puncture rules may be applied in pilot selection in each RU.

Exactly how many pilots are necessary may be based on various factors. For example, given 4 pilots in 11ac20 to achieve frequency error accuracy A, accuracy of A/2 should be enough with 2×LTF, while 11ax 2×LTF with 4 pilots can get B=A/2 due to 2× symbol duration, and flax 2×LTF with 8 pilots can get C=B/sqrt(2) due to double number of pilots.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

Figure 5A:
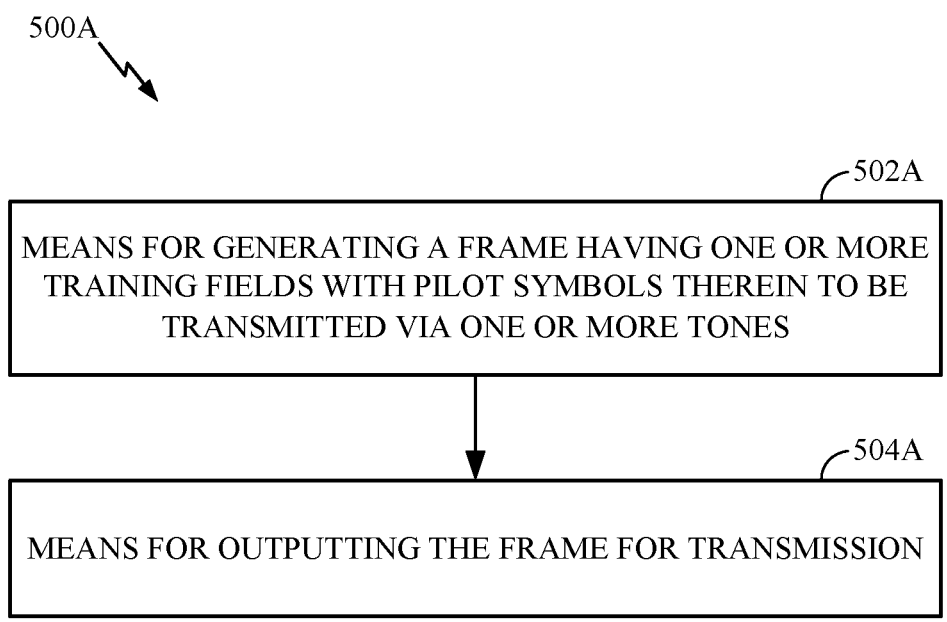
FIG. 5A illustrates example means capable of performing the operations shown in FIG. 5.
Figure 6A:
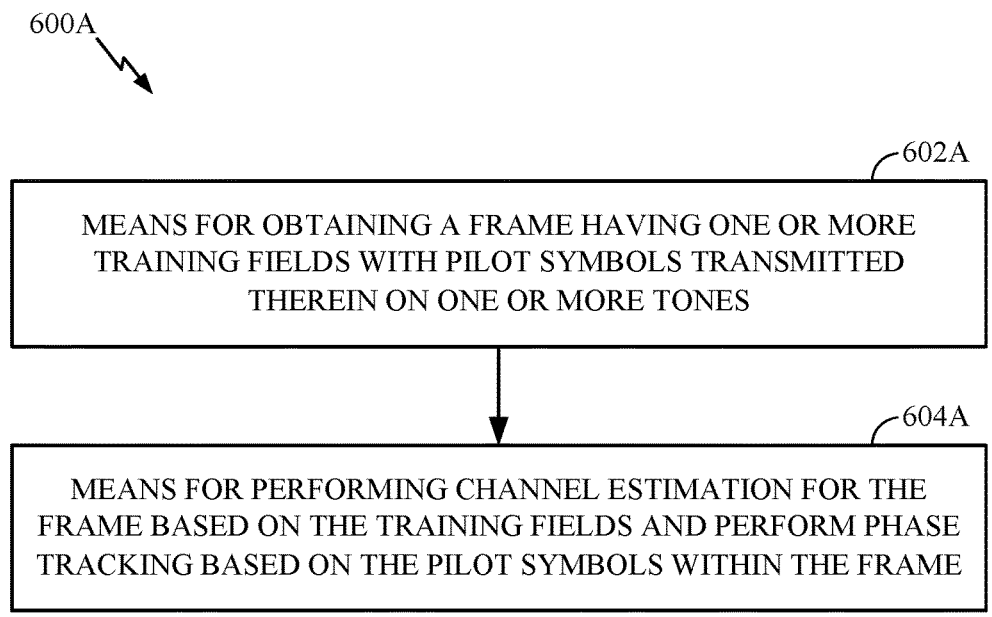
FIG. 6A illustrates example means capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500, 600, 700, and 800 illustrated in FIGS. 5, 6, 7, and 8 correspond to means 500A, 600A, 700A and 800A illustrated in FIGS. 5A, 6A, 7A, and 6A, respectively.

For example, means for receiving and means for obtaining may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for transmitting and means for outputting may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for generating, means for determining, means for selecting, means for performing channel estimation, and/or means for performing phase tracking may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a period that at least one second apparatus is scheduled to be awake, instructions for generating a first frame for transmission to the second apparatus during the period, instructions for outputting the first frame for transmission, instructions for obtaining a second frame in response to the first frame, instructions for determining ranging information based on a time difference between transmission of the first frame and receipt of the second frame, instructions for generate a third frame including the ranging information, and instructions for outputting the third frame for transmission. In another example, instructions for determining a period to awake from a low power state, instructions for obtaining a first frame from a second apparatus during the period, instructions for generating a second frame for transmission to the second apparatus in response to the first frame, instructions for outputting the second frame for transmission to the second apparatus, instructions for obtaining a third frame comprising ranging information, determined by the second apparatus, based on a time difference between transmission of the first frame and receipt of the second frame, and instructions for determining a relative location of the second apparatus to the first apparatus based on a third frame.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to generate a frame having a plurality of orthogonal training field sequences and Nss spatial streams, wherein a total number of the orthogonal training field sequences is less than the Nss spatial streams, wherein each orthogonal training field sequence is assigned to at least one of the Nss spatial streams, and wherein the orthogonal training field sequences comprise a first orthogonal training field sequence for a first stream of the Nss spatial streams, and a second orthogonal training field sequence for a remainder of the Nss spatial streams; and
an interface configured to output the frame for transmission as a single user (SU) transmission, a multi-user (MU) multiple input multiple output (MIMO) transmission, or an orthogonal frequency division multiple access (OFDMA) transmission.

2. The apparatus of claim 1, wherein the orthogonal training field sequences comprise long training field sequences having longer symbol durations relative to a reference duration.

3. An apparatus for wireless communications, comprising:
an interface configured to obtain a frame having a plurality of orthogonal training field sequences and Nss spatial streams, wherein a total number of the orthogonal training field sequences is less than the Nss spatial streams, wherein each orthogonal training field sequence is assigned to at least one of the Nss spatial streams, wherein the orthogonal training field sequences comprise a first orthogonal training field sequence for a first stream of the Nss spatial streams, and a second orthogonal training field sequence for a remainder of the Nss spatial streams, and wherein the frame is obtained via a single user (SU) transmission, a multi-user (MU) multiple input multiple output (MIMO) transmission, or an orthogonal frequency division multiple access (OFDMA) transmission; and
a processing system configured to perform at least one of channel estimation or phase tracking based on the orthogonal training field sequences.

4. The apparatus of claim 3, wherein the orthogonal training field sequences comprise long training field sequences having longer symbol durations relative to a reference duration.

5. A method for wireless communications, comprising:
generating a frame having a plurality of orthogonal training field sequences and Nss spatial streams, wherein a total number of the orthogonal training field sequences is less than the Nss spatial streams, wherein each orthogonal training field sequence is assigned to at least one of the Nss spatial streams, and wherein the orthogonal training field sequences comprise a first orthogonal training field sequence for a first stream of the Nss spatial streams, and a second orthogonal training field sequence for a remainder of the Nss spatial streams; and outputting the frame for transmission as a single user (SU) transmission, a multi-user (MU) multiple input multiple output (MIMO) transmission, or an orthogonal frequency division multiple access (OFDMA) transmission.

6. The method of claim 5, wherein the orthogonal training field sequences comprise long training field sequences having longer symbol durations relative to a reference duration.

7. A method for wireless communications, comprising:
obtaining a frame having a plurality of orthogonal training field sequences and Nss spatial streams, wherein a total number of the orthogonal training field sequences is less than the Nss spatial streams, wherein each orthogonal training field sequence is assigned to a at least one of the Nss spatial streams, wherein the orthogonal training field sequences comprise a first orthogonal training field sequence for a first stream of the Nss spatial streams, and a second orthogonal training field sequence for a remainder of the Nss spatial streams, and wherein the frame is obtained via a single user (SU) transmission, a multi-user (MU) multiple input multiple output (MIMO) transmission, or an orthogonal frequency division multiple access (OFDMA) transmission; and performing at least one of channel estimation or phase tracking based on the orthogonal training field sequences.

8. The method of claim 7, wherein the orthogonal training field sequences comprise long training field sequences having longer symbol durations relative to a reference duration.

9. The apparatus of claim 1, further comprising:
a transmitter configured to transmit the frame, wherein the apparatus is configured as an access point.

10. The apparatus of claim 3, further comprising:
a receiver configured to receive the frame, wherein the apparatus is configured as a wireless station.

* * * * *